United States Patent [19]
Nier

[11] 3,917,393
[45] Nov. 4, 1975

[54] VARIOSLIT

[75] Inventor: Dieter Nier, Munchen-Gladbach, Germany

[73] Assignee: Rank Xerox Ltd., London, England

[22] Filed: Aug. 30, 1974

[21] Appl. No.: 501,944

[30] Foreign Application Priority Data
Sept. 21, 1973 Germany............................ 2347622

[52] U.S. Cl. ...................... 353/101; 355/8; 355/57; 355/49; 353/76
[51] Int. Cl.² ........................................... G03B 3/02
[58] Field of Search ................ 353/76, 101, 97, 75; 350/205 T; 355/11, 18, 57, 60, 65, 66, 55, 8, 49

[56] References Cited
UNITED STATES PATENTS
3,542,467   11/1970   Ferguson ........................ 355/60 X Primary Examiner—Harry N. Haroian

[57] ABSTRACT

An optical apparatus comprising an image-forming arrangement for projecting an image of an illuminated object onto an image plane, the image-forming arrangement having a plurality of magnification modes in which modes the angle of incidence of the image rays onto the image plane changes in dependence upon the mode, and a slit arrangement positioned between the image forming arrangement and the image plane, characterized in that the slit arrangement defines a slit the effective plane of which is inclined to the image plane such that the slit presents a different effective slit width to the image rays in accordance with the angle of incidence of the image rays (and therefore in accordance with said mode), whereby the greater the magnification, the wider the effective slit width.

4 Claims, 3 Drawing Figures

VARIOSLIT

BACKGROUND OF THE INVENTION

This invention relates to an optical apparatus which includes an image-forming arrangement for projecting an image of an illuminated object onto an object plane, the image-forming arrangement having a plurality of magnification modes, in which modes the angle of incidence of the image ray onto the image plane changes in dependence upon the mode, and a slit arrangement positioned between the image-forming arrangement and the image plane. The invention has particular, though not exclusive, application to xerographic copying machines which offer a choice of magnification (or reduction) modes.

Xerographic copying machines having a plurality of magnification modes are well known, and typical of such machines are those which employ a xerographic drum which is rotated through a series of processing stations. One form of optical arrangement used in such a machine includes a platen on which an original to be copied is placed. The platen is transparent, and a set of lamps reflect light from the original on the platen through an image-forming arrangement including a scanning mirror, which, in conjunction with a lens in the image-forming arrangement permits the projection of a flowing image which is synchronized with the rotating motion of the drum. Generally, the scanning mirror is fixed, apart from its scanning motion about a pivot axis, and if a multiple-magnification machine is required, it is usual to move the lens of the image-forming arrangement along the optical path between the scanning mirror and the drum. Movements of the lens along the optical path cause corresponding changes in the conjugate length of the system, and it is therefore necessary to employ a second image mirror which is movable in conjunction with the lens so as to effect the appropriate compensation in optical path length. The final element in the optical system is an image slit located very close to the drum surface so as to define a sharp image on the drum surface.

Such a system as has just been described gives rise to the problem that unless steps to prevent it are taken, the intensity of the illumination falling on the drum i.e., the amount of light falling on unit area in unit time, varies with the magnification mode. Clearly, the larger the magnification, the smaller will be the intensity of the illumination. In circumstances such a variation in the intensity of illumination may be tolerable, especially of the xerographic system has a wide exposure latitude, and there are not very great differences between the magnifications in the various magnification modes. In other circumstances, however, the variations in intensity of illumination may not be tolerable, giving rise to over-exposure in the magnification mode giving the smallest magnification, and giving rise to under-exposure in the mode giving the greatest magnification. One way of overcoming the problem would be to vary the intensity of the illumination used to illuminate the original. Such a system, however, suffers from the disadvantage that it requires additional electrical circuitry.

SUMMARY OF THE INVENTION

It is an object of the present invention to provide an optical apparatus in which the above problem and disadvantages are substantially reduced.

The present invention is accordingly characterized in that the image slit arrangement defines a slit the effective plane of which is inclined to the image plane such that the slit presents a different effective slit width to the image rays in accordance with the angle of incidence of the image rays (and therefore in accordance with the magnification mode), whereby the greater the magnification, the wider is the effective slit width.

DRAWINGS

An optical apparatus in accordance with the invention will now be described, by way of example, with reference to the accompanying drawings, in which.

Figure 1:
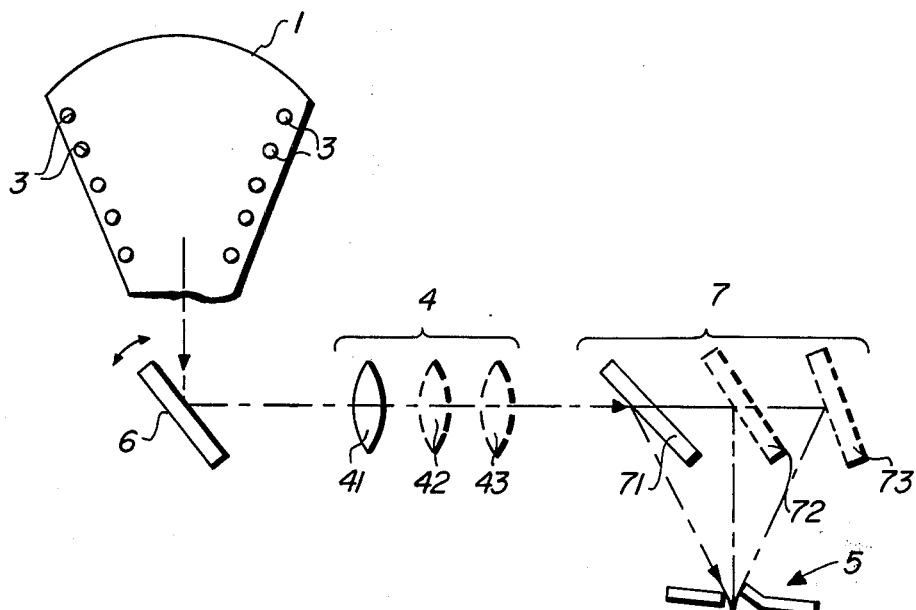
FIG. 1 is a diagramatic side view of an optical apparatus having a plurality of magnification modes, and incorporating the present invention.

Referring to FIG. 1, the optical apparatus of the invention is shown by way of example as the optical system of a xerographic copying machine. The optical apparatus is used for forming a flowing image of an object, such as a document (not shown) placed upon a platen 1, on the moving surface of a xerographic drum. The platen 1 is transparent to allow illumination of the original by a number of lamps 3. A lens 4 forms part of an image-forming arrangement for projecting an image of the illuminated object on the platen onto the surface of the drum 2 through a slit arrangement 5. In operation of the machine, drum 2 is rotated so that successive portions of its photoconductive surface pass through an image plane defined by a plane tangential to the drum surface directly below the slit of the slit arrangement 5. A scanning mirror 6 which also forms part of the image-forming arrangement and which is mounted for pivotal movement about a pivot axis, projects a flowing image in conjunction with lens 4, onto the surface of the drum, the angular velocity of the scanning movement of mirror 6 being synchronized with rotation of the drum so as to lay down on the drum an image of the object on platen 1. To complete the image-forming arrangement there is provided an image mirror 7.

The machine may be made to copy the original placed on platen 1 in any one of a plurality of magnification (or reduction) modes. Throughout this specification, the term "magnification" is taken to cover both positive and negative magnifications. Negative magnifications are, of course, reductions. In the following description, for the sake of explanation three magnification modes are described. It will be understood, of course, that any number of magnification modes from two upwards may be incorporated in a machine in accordance with the invention.

In order to change the magnification mode of the machine, lens 4 is moved along the optical path through the image-forming arrangement, the three positions of the lens shown being denoted as 41, 42 and 43. The largest magnification mode is represented by lens position 41. In order to compensate for changes in the conjugate length of the system which result from moving the lens along the optical path, the position of image mirror 7 is changed by an appropriate amount. The three positions of image mirror 7 corresponding to positions 41, 42 and 43 of the lens 4 are positions 71, 72 and 73 respectively. Furthermore, in order that the image rays pass through the slit arrangement 5 in each case, the mirror 7 has to be tilted as it moves from one position to the next, changing its inclination to the optical path through the lens (as shown). It can thus be seen that the angle of incidence of the image rays onto the image plane varies with the magnification mode.

Figure 2:
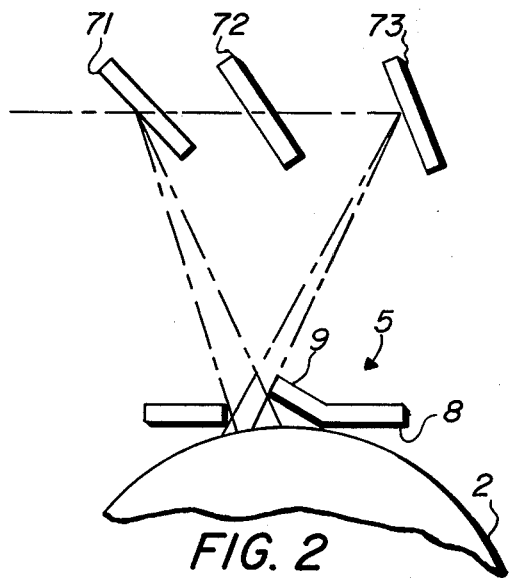
FIG. 2 is an enlarged diagramatic view of part of the apparatus shown in FIG. 1.
Figure 3:
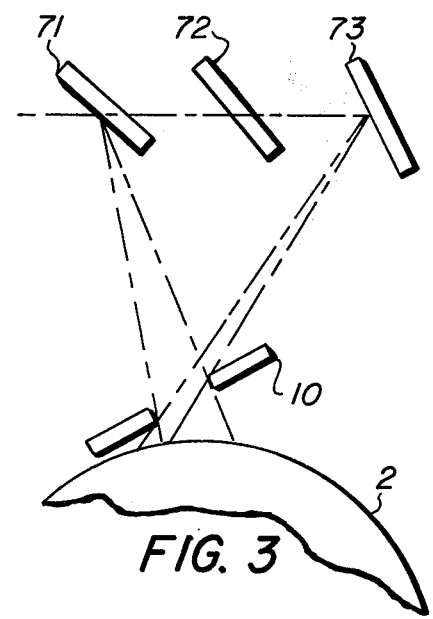
FIG. 3 is a view corresponding with FIG. 2, but showing a different embodiment of the invention.

Referring now to FIG. 2, it can be seen how advantage has been taken of the varying angle of incidence of the image rays to change the effective slit width of the slit arrangement 5. The slit arrangement 5 comprises a generally plane base member 8 lying substantially in the image plane. Instead of having a slit cut directly in the base member 8, as in previous slit arrangements used in such a machine, the right hand edge of the slit in base member 8, as seen in FIG. 2, is bent upwards to provide a protruding lip 9. The upper edge of lip 9 and the left hand edge of the slit in the base member 8 define between them a slit which lies in an effective plane inclined to the image plane. The effective slit aperture could also be provided in a base member 10 which is itself inclined to the image plane, thereby providing the alternative embodiment shown in FIG. 3.

As can be seen in FIG. 2, when image mirror 7 is in position 71, corresponding to the magnification mode giving the largest magnification, the angle of incidence of the image rays is such that the effective slit width of slit arrangement 5 is relatively wide, and is substantially the same as the slit width which would result if the lip 9 were not present. At the other extreme, however, when the machine is in the magnification mode giving the smallest magnification, the image mirror 7 is in position 73. In this case, the angle of incidence of the image rays is such that lip 9 cuts off part of the radiation which would otherwise pass through the slit in base member 8 if the lip 9 were not present. Thus, the intensity of illumination at the image plane is reduced.

The actual width of the slit defined by the left hand edge of the slit in base member 8 and the upper edge of lip 9, and the inclination of this slit to the image plane, will be calculated to provide the most acceptable compromise between the relative intensities of illumination at the image plane obtained in the various magnification modes. Thus, while it will not always be possible to obtain exactly constant intensity of illumination regardless of the magnification mode, it will be possible by a suitable choice of slit configuration to obtain substantially constant intensity of illumination. In any event, it will be possible to improve considerably the performance of a machine which previously employed the general arrangement described above with reference to FIG. 1, but which employed a conventional slit adjacent the image plane. Furthermore, by employing the configuration shown in FIG. 2 for the slit arrangement 5, it is possible to make a direct replacement of the slit arrangement without having to change any part of the machine.

What is claimed is:

1. An optical apparatus comprising a folded image-forming system for projecting an image of an illuminated object onto an image plane in a plurality of magnifications in which the angle of incidence of the image rays onto the image plane is different in each of magnifications, and a slit member positioned between the image-forming system and the image plane, characterized in that the slit member defines a slit the effective plane of which is inclined to the image plane such that the slit presents a different effective slit width to the image rays for each of the plurality of magnifications, the effective slit width being greatest for the greatest magnification and progressively smaller for correspondingly smaller magnifications, so that a substantially constant intensity of illumination is obtained at the image plane regardless of the magnification.

2. The apparatus of claim 1 wherein the slit arrangement comprises a plane base member having an elongated aperture thereon, one edge of the aperture constituting one edge of said slit, and the other edge of the aperture having a protruding lip inclined to the plane of the base member, the outer edge of said lip constituting the other edge of said slit.

3. The apparatus of claim 1 wherein said image-forming system comprises a scanning mirror, a lens, and an image mirror, the lens being movable to a plurality of positions along the optical path through the image-forming system to provide said plurality of magnifications, and the image mirror being rotatable and movable along the optical path in cooperation with movements of the lens to compensate for changes in the conjugate length of the system.

4. A variable magnification optical system for projecting an image of an object from an object station to an image station, including the following disposed along an optical axis:
   a projection lens disposed for movement along said optical axis to vary the magnification of said system,
   an image reflector to fold said optical axis from said projection lens toward said image station, said image reflector being disposed for movement along seaid optical axis to vary the image conjugate distance as required for a desired magnification and being further disposed for rotation about an axis orthogonal to said optical axis to direct said optical axis at said image station from any location of said image reflector along said optical axis, whereby said optical axis is incident at said image station at a different angle for each magnification, and
   an aperture member defining an image aperture therein and disposed between said image reflector and said image station, said aperture member being oriented relative to said optical axis so as to present an apparent aperture of different size to said optical axis for different image magnifications and correspondingly different orientations of incidence of said optical axis.

* * * * *